(12) United States Patent
Lang (10) Patent No.: US 6,972,748 B1
(45) Date of Patent: Dec. 6, 2005

(54) J-KEY INPUT FOR COMPUTER SYSTEMS

(75) Inventor: Eric G. Lang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 09/652,330

(22) Filed: Aug. 31, 2000

(51) Int. Cl.⁷ .............................................. G09G 5/08
(52) U.S. Cl. ...................... 345/160; 345/156; 341/22; 710/67
(58) Field of Search ............................... 345/168, 172, 345/160–161, 156; 341/21, 22, 23; 710/67

(56) References Cited

U.S. PATENT DOCUMENTS

| | | | |
|---|---|---|---|
| 5,661,476 A * | 8/1997 | Wang et al. ................... 341/22 |
| 6,052,070 A * | 4/2000 | Kivela et al. ................. 341/22 |
| 6,151,032 A * | 11/2000 | Cheng ......................... 345/469 |
| 6,286,064 B1 * | 9/2001 | King et al. .................... 710/67 |
| 6,320,519 B1 * | 11/2001 | Hsu et al. ..................... 341/23 |
| 6,340,937 B1 * | 1/2002 | Stepita-Klauco ............. 341/23 |
| 6,346,894 B1 * | 2/2002 | Connolly et al. ............. 341/22 |
| 6,348,878 B1 * | 2/2002 | Tsubai .......................... 341/23 |
| 6,378,234 B1 * | 4/2002 | Luo ............................. 341/22 |

* cited by examiner

Primary Examiner—Alexander Eisen
Assistant Examiner—Kimnhung Nguyen
(74) Attorney, Agent, or Firm—Merchant & Gould P.C.

(57) ABSTRACT

Information elements such as alphanumeric characters are input into a small computing device having little or no keyboard by operating with a predetermined number of strokes on a multi-directional input key, such as a joystick, input button or pointing button. Each direction of movement of the input key provides a input choice for a user allowing the user to make a sequence of choices through a hierarchy of selectable information elements. The sequence of strokes in the predetermined number of strokes is detected to identify the information element selected. A display provides information to the user indicating the information elements or characters available and the pattern of strokes to select a particular character. In some implementations of the invention the entire key stroke pattern is displayed. In other implementations of the invention, the display provides guidance before each stroke to indicate the key stroke choices available to select subsets of the information elements.

35 Claims, 7 Drawing Sheets

J-KEY INPUT FOR COMPUTER SYSTEMS

TECHNICAL FIELD

This invention relates to inputting information into computing systems using a multi-directional key stroke device such as a joystick or input button. More particularly the invention relates to entering information into the computing system with multi-directional key strokes and interpreting multi-directional key strokes as input information for the computing system.

BACKGROUND OF THE INVENTION

In addition to conventional computing systems for the office, home and mobile environment, there are now many small information processing devices that have significant processing power. These small information processing devices include personal digital assistants with touch screens, handheld personal computing devices, cellular phones and watches. These small information processing devices have no keys or a very limited key set. They rely on other forms of manual input such as stylus/touch screen or, if there is a limited key set such as on a cellular phone, each key must be pressed multiple times to select a particular character as input.

The difficulty with the stylus/touch screen input technique is that it requires a sophisticated character recognition program to interpret the user's hand writing. Also there are restrictive rules on the handwritten character strokes by the user. Alternatively, the touch screen may display a keyboard, sometimes called a soft keyboard, and the user touches the key on the screen with the stylus; i.e. hunt and peck entry. For small display screen, this touching a character location must be precise. Either process for using stylus and touch screen to enter input information is slow.

The difficulty with data entry using multiple pushes on a key in a limited key set is that the process does not lend itself to muscle memory for the user. For example, in the telephone key set, pressing a number key one, two or three times will enter three different alphabetic characters. Further, this mode of alphabetic character entry occurs only after entering a function that expects alphabetic characters. The user must remember which key to press and how many times to press it. In addition to the process not being intuitive and not leading to muscle memory, the entry process using multiple presses of a selected key from a key set is also very slow.

SUMMARY OF THE INVENTION

In accordance with the present invention, the above and other problems are solved by inputting information into an information processing device with a predetermined number of strokes of a multi-directional input key. Each direction of movement of an input key provides a input choice for a user allowing the user to make a sequence of choices through a hierarchy of selectable information elements. The sequence of strokes in the predetermined number of strokes is detected to identify the information element selected.

In another aspect of the invention a display provides information to the user indicating the information elements available and the pattern of strokes to select a particular information element. In some implementations of the invention the entire key stroke pattern is displayed. In another implementation of the invention, the display provides guidance before each stroke to indicate the key stroke choices available to select subsets of the information elements.

The invention may be implemented as a computer process, a computing system or as an article of manufacture such as a computer readable medium or a computer program product. The computer readable medium or computer program product may be a computer storage medium readable by a computer system and encoding a computer program of instructions for executing a computer process to implement the invention. The computer readable medium or computer program product may also be a propagated signal on a carrier where the signal is readable by a computing system and encodes a computer program of instructions for executing a computer process to implement the invention.

The great advantage of the invention is that it provides a user a way to enter many information choices with a single key. Further, it also provides a repetitive pattern for such entry and that pattern lends itself to muscle memory of the user.

These and various other features as well as advantages, which characterize the present invention, will be apparent from a reading of the following detailed description and a review of the associated drawings.

DETAILED DESCRIPTION OF THE INVENTION

In a general implementation of the invention, an P-axis controller, or directional key stroke device, can select any information element on a list with a predetermined number N of input strokes with the P-axis controller. The P-axis controller can be embodied as a single selection controller that yields one selection from each of the multiple axes, or a multiple selection controller that yields a selection for each switch on the axis where only one switch at a time can be actuated. The number of axes P multiplied by the switches S per axis equals the number of directions M for the controller. The number of directions M determines the depth N to select an element from a tree hierarchy of all the information elements. Thus, N is also the number of strokes or presses on the controller to select an element and is given by the following expression:

$N=\log_{(P*S)}E$, where

N is the number of strokes to select an information element and is also the depth or levels in the hierarchical list of elements, P is the number of axes provided by the key stroke device, S is the number of switches per axis, and E is the number of elements on a list.

As an example if a two-axis (X,Y) joystick with two switches per axis (Left, Right and Up, Down) is used to select one of sixty four elements, the depth N equals log of sixty four to the base four (two axes multiplied by two switches per axis), $N=\log_{(4)}64=3$. Any one of sixty four elements can be selected with three pushes or strokes on the quad-directional joystick.

As another example, if P, the number of axes, is four and S, the number of switches per axis, is two, M equals eight (octo-directional—every 45°) for the input button or controller. Then for sixty four elements the number of strokes is $N=\log_{(8)}64=2$. With this same octo-directional controller, one element of up to 512 elements can be selected with three strokes, $N=\log_{(8)}512=3$. One application for such a large number of elements might be a calendar application.

In addition to discrete number of switches for each axis, in another embodiment of the invention a variable range of inputs for each axis may be used. For example a touch panel or a joystick might have a range of values that are sensed depending upon the touch point or the joystick position. This range of values in each axis could be divided into sub-range values to input a given switch indication in a given sub-range for each axis. In effect a grid could be established for the input device and the stroke position of the input device in the grid would indicate a selection for each axis.

Figure 1:
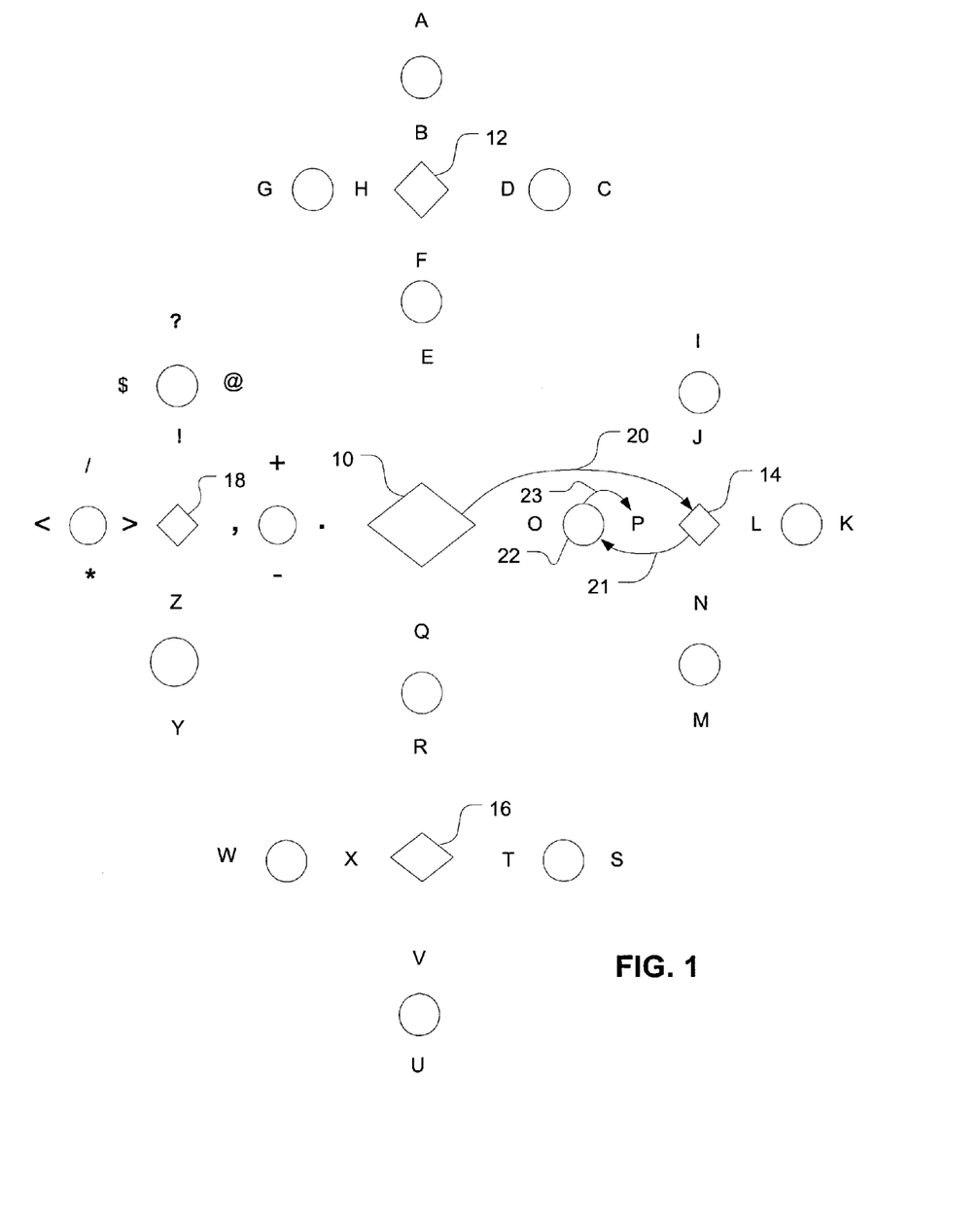
FIG. 1 shows the pattern of key strokes for a multi-directional input button in one embodiment of the invention.

FIG. 1 illustrates a key stroke pattern for one embodiment of the invention wherein a four directional button may be used to select with three directional keystrokes an alphabetic character or symbol character. Of course, the information elements may be graphical information elements such as icons, images, internet links, program links, file links, etc, rather than alphabetic or numeric characters and symbols.

In FIG. 1, the diamonds and circles represent nodes in the keystroke pattern and also correspond to nodes at levels in the hierarchy of selectable elements. Since the button is quad-directional, there are four possible selections from each node. In the exemplary embodiment in FIG. 1, not all nodes have four information elements associated with the node.

The starting node 10 is at the highest or root level and represents the entire selectable character set. A first stroke would go from node 10 in one of four directions—up to node 12, right to node 14, down to node 16 or left to node 18. An upward stroke from node 10 to node 12 would select the character set A through H. A left stroke from node 10 to node 18 would select various punctuation and other keyboard symbols plus the letters Y and Z.

For example, to select the character P, the key is first moved right from node 10 to node 14 with stroke 20. In the second stroke the directional key is moved left from node 14 to node 22. Finally, in the third stroke, the key would move right from node 14 to character P.

Figure 2:
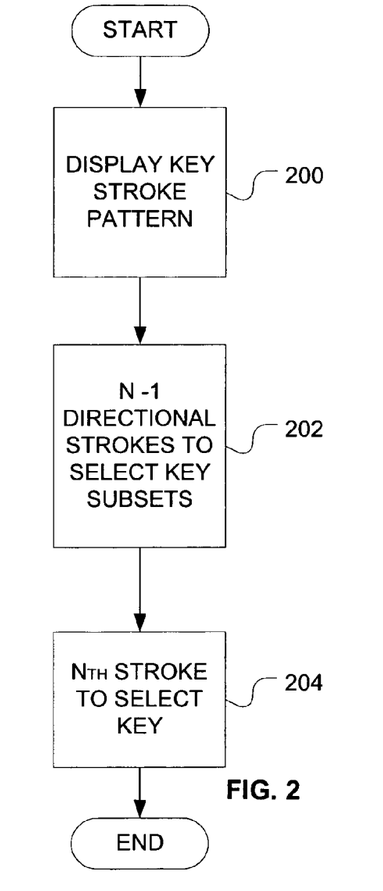
FIG. 2 illustrates an operational flow diagram for user interface operations performed in inputting information into a computing system in accordance with multiple, multi-directional key strokes.
Figure 3:
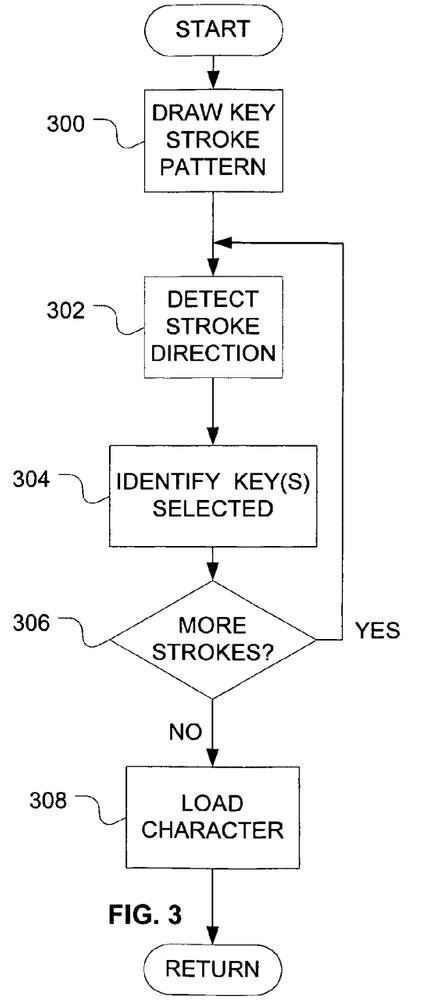
FIG. 3 shows an operational flow diagram for computing system operations interpreting multiple, multi-directional strokes to load information in the system.

To implement the pattern of strokes at a user interface and to interpret the pattern of strokes in the computing device, operational flow diagrams in FIGS. 2 and 3 illustrate one embodiment of the invention. The logical operations of the various embodiments of the present invention are implemented as a sequence of user interface actions with the computer, and as a sequence of computer implemented actions. The computer implemented actions may be embodied in (1) a sequence of software logical operations or program modules running in a computing system or (2) a sequence of computer hardware logical operations performed by interconnected machine modules or logic circuits within the computing system. The computer implementation is a matter of choice dependent on the performance requirements of the computing system implementing the actions. Accordingly, the logical operations making up the embodiments of the present invention described herein are referred to variously as operations, actions or modules.

FIG. 2 illustrates the operational flow at the user interface. Display operation 200 displays the complete character set arranged in a pattern such as FIG. 1 to guide the user in moving the directional pointer key. In stroke operation 202, a directional pointer key or input button is moved in a first direction to select a character subset. For example, in FIG. 1, the pointer key is moved right in stroke 20 to select the character subset I through P. Stroke operation 202 continues to move the directional key to select smaller and smaller character subsets until N–1 strokes have been made. For example, in FIG. 1, N–1=2 so stroke operation 202 moves a second directional stroke 21 left from node 14 to node 22 to select the character subset O P. Finally, the Nth stroke operation 204, where N is the number of strokes defined for the input pattern, moves to select a character. In the example in FIG. 1, N is three and Nth stroke operation 204 of FIG. 2 moves the pointer key in a third stroke 23 to the right to select the character P.

The logical operations to interpret these strokes in the computing system is shown in FIG. 3. The operation flow in FIG. 3 begins when draw operation 300 draws the initial character set arranged in a key stroke pattern in a display page for display by the computing device in operation 200 of FIG. 2. The detect operation 302 detects a stroke and further detects the direction of the stroke. Identify operation 304 interprets the direction of the stroke and identifies a character or set of characters represented by the direction of the stroke. Identify operation 304 bases the interpretation on the number of the strokes, the sequence of strokes and the direction of each stroke.

Query operation 306 tests whether there are more strokes in the sequence of strokes required to identify a character. If more strokes are required, the flow branches YES from operation 306 and returns to operation 302 to detect the next stroke. If no more strokes are required, the flow branches NO to load operation 308. Load operation 308 then loads the character identified by identify operation 306 in the user string information for the computer.

In the example of FIG. 1, since there are three strokes per character, detect operation would sequentially detect three strokes as the flow makes three passes (two loop returns) through operations 302, 304 and 306. After the third stroke, operation 308 loads the selected character. For example from FIG. 1 the strokes Down, Down, Up would load the letter V in the user string completing the interpretation by operations in FIG. 3 of an N sequence of three strokes in four directions to enter a character into the computing system.

Figure 4:
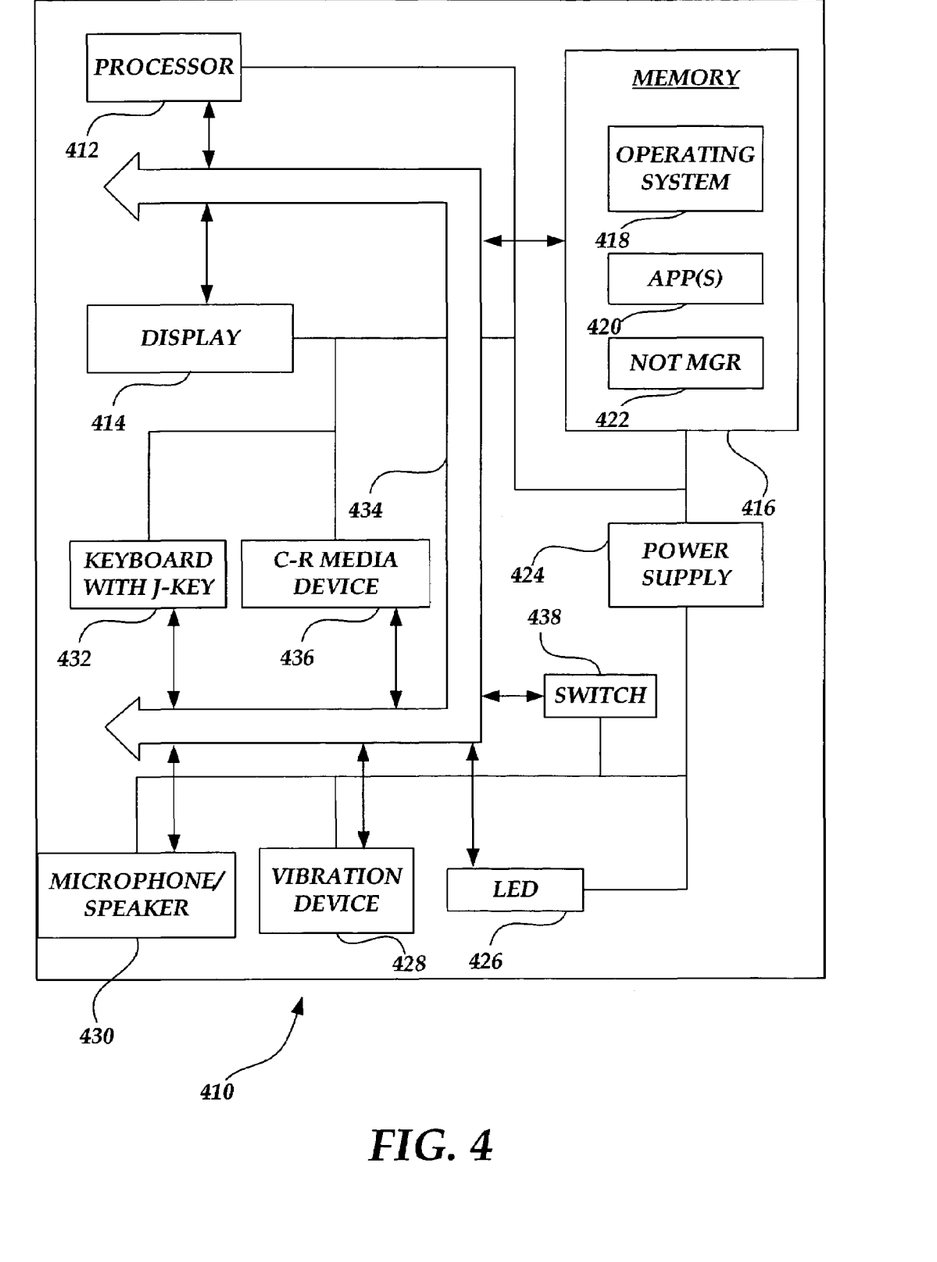
FIG. 4 illustrates an exemplary small computing device for operating in accordance with the various embodiments of the invention.

FIG. 4 illustrates an example of a suitable operating environment 410 in which embodiments of the invention may be implemented. The operating environment 410 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices and the like.

FIG. 4 shows functional components of a small computing device 410. Various small computing devices may have all or some of the components illustrated in FIG. 4. The small computing device has a processor 412, a memory 416, a display 414 and a keyboard with J-Key 432. Keyboard 432 contains at least a J-Key, a multi-directional key stroke device such as a joystick, an input button or pointer key/button and contains other keys. Usually in small computing devices the other keys will be a very limited key set. For example, the key set in a cellular phone, or the key set in a palm sized computer or personal digital assistant. In the case of a watch size device the keyboard may be only the J-Key.

The memory 416 generally includes both volatile memory (e.g. RAM) and non-volatile memory (e.g. ROM, PCMCIA cards, etc.). An operating system is resident in memory 416 and executes on the processor 412. The small computing device 410 includes an operating system 418, such as the Windows® CE operating system from Microsoft Corporation or other operating systems including device specific operating systems for the simple computing device.

One or more application programs 420 are loaded into memory 416 and run on the operating system 418. Examples of applications include telephony programs, email programs, scheduling programs, PIM (personal information management) programs, word processing programs, spreadsheet programs, Internet browser programs, and so forth. The small computing device 410 also has a notification manager 422 loaded in memory 416. The notification manager 422 handles notification requests from the applications 420.

The small computing device 410 has a power supply 424, which is implemented as one or more batteries. The power supply 424 might further include an external power source that overrides or recharges the batteries mounted in the device. The external power source might include an AC adapter or a powered docking cradle.

The small computing device 410 is also shown with two types of external notification plus a microphone/speaker 430. The external notification devices are an LED 426 and a vibration device 428. In addition the speaker in the microphone/speaker 430 may be used to provide audio notification. These notification devices are directly coupled to the power supply 424 so that when activated, they remain on for a duration dictated by the notification mechanism. Switch 438 is controlled by the processor 432 to shut off power to conserve energy.

The small computing device 410 typically includes at least some form of computer readable media. Computer readable media can be any available media that can be accessed by small computing device 410. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by the small computing device 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 5:
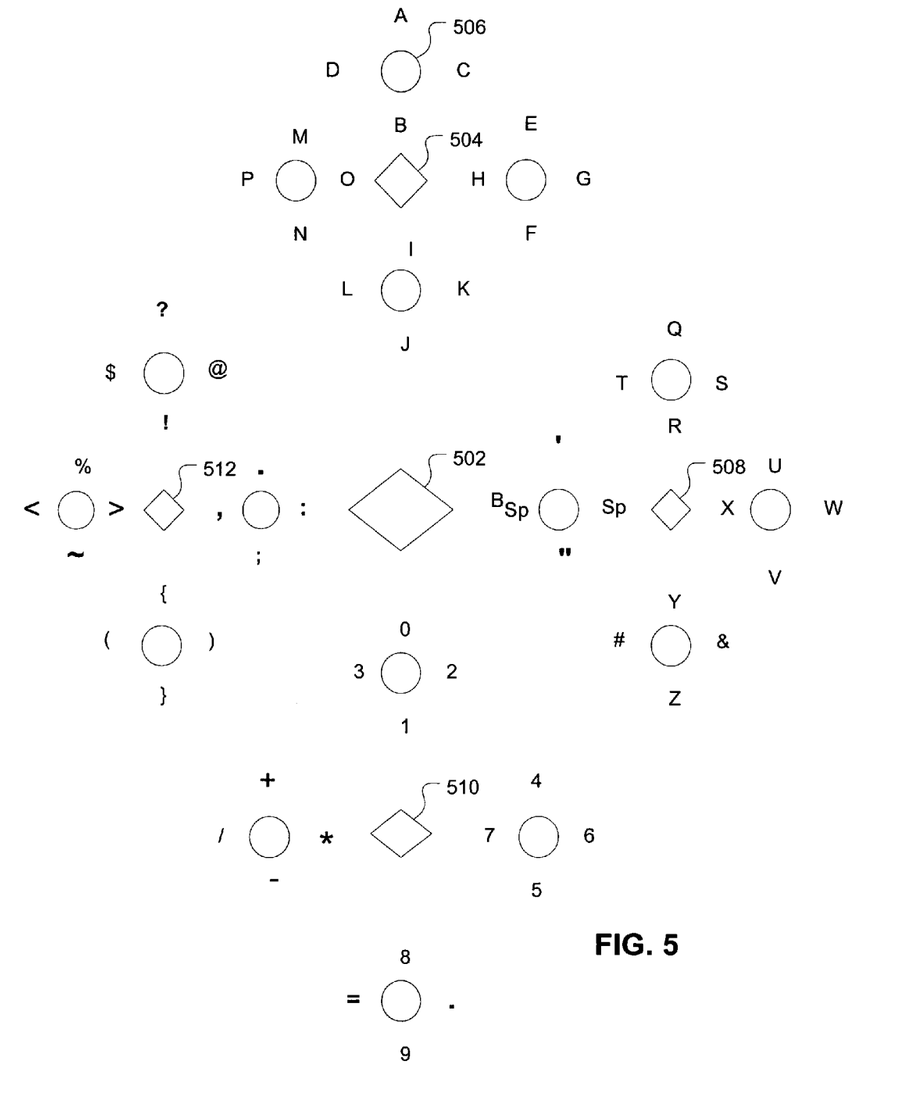
FIG. 5 shows a pattern of key strokes for inputting alphanumeric characters and symbols with a quad-directional input button operating with three strokes per character in another embodiment of the invention.

FIG. 5 shows another multi-directional keystroke pattern having a four directional input key and a sequence of three strokes to identify an information element; a complete alphanumeric character set plus selected symbol characters. In this keystroke pattern, a first upward stroke from node 502 to node 504 selects alphabetic characters A through P. A second stroke from node 504 which is up to node 506 selects the character subset A, B, C, D. From node 506, a third and final character stroke would select A upward, B downward, C to the right, and D to the left. Of course, any number of patterns for filling the character's positions about the nodes may be selected. However, such a pattern should be intuitive to the user and should be repetitive.

In the pattern set of FIG. 5, a right stroke from node 502 to node 508 will reach the remainder of the alphabetic characters not associated with node 504. In addition the information element set associated with node 508 includes the space and back space operative elements and some text-related symbols. A downward stroke from node 502 to node 510 will select a numeric subset with arithmetic operators. A left stroke from node 502 to node 512 will select additional symbols typically associated with a keyboard.

Figure 6:
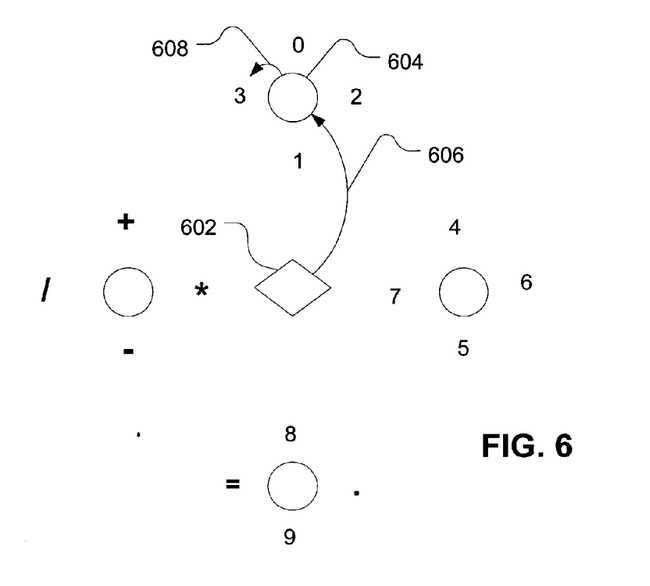
FIG. 6 shows a pattern of key strokes for inputting numeric characters and arithmetic functions using a quad-directional input button operating with two strokes per character.

In FIG. 6, a keystroke pattern for arithmetic operations with numeric characters is shown alone. This might be used in an application where only arithmetic function is desired or only numeric characters need be entered. The keystroke pattern set in FIG. 6 is again a four directional input key but requires only two strokes to enter a character. Accordingly, to select a three, the input key would be moved upward from node 602 to node 604 with upstroke 606. The second and final stroke would be a left stroke 608 from node 604 to numeral three. To illustrate how an arithmetic operation might be easily performed using the four directional key with a sequence of two strokes to select each character, the operation of adding eight plus seven would require the following strokes: right and left to enter seven, left and up to enter plus, down and up to enter eight, and down and left to enter equals.

Figure 7A:
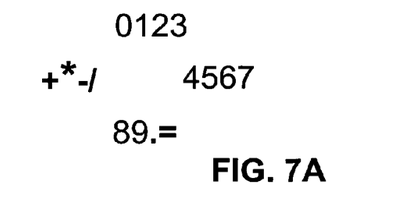
FIG. 7A illustrates a first selection-level, three line display conveying the same stroke information as FIG. 6 to guide a user in making a first directional stroke.
Figure 7B:
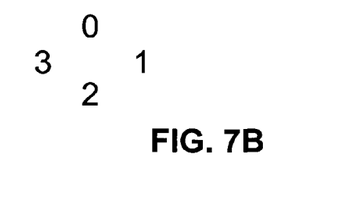
FIG. 7B illustrates an example of a second selection-level, three line display after a first directional stroke upward at the first selection level in FIG. 7A.

In another embodiment of the invention using stroke guidance displays, the user interface display is depicted in FIGS. 7A and 7B. In this example of a display configuration, a small display screen is available and has only three display lines. Thus, a display on the first line or top line would contain zero, one, two, three indicating these numeric characters would be selectable by an upward stroke. Likewise, four, five, six, and seven are selectable by a right stroke. Characters eight, nine, period or decimal point, and equal are selectable by a down stroke, and the arithmetic operators plus, multiply, minus, and divide are selected by a left stroke. Assuming the user were to move the key first in an up stroke, then the display would change to the display depicted in FIG. 7B to again guide the user in how to select a character with a second stroke in one of the four directions of the input key. In the example shown in FIG. 7B, a two would be selected by a downward stroke of the input key which is the second stroke in the sequence.

Figure 8A:
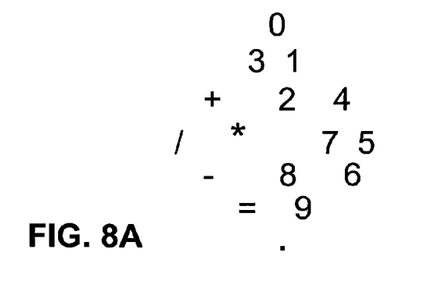
FIG. 8A illustrates a first selection-level, seven line display conveying the same stroke information as FIG. 6 to guide a user in making a first directional stroke.
Figure 8B:
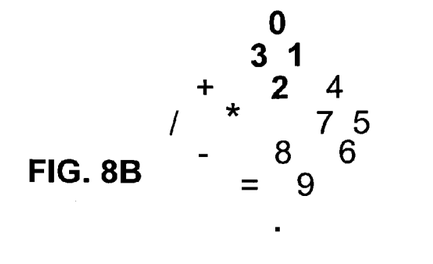
FIG. 8B illustrates an example of a second selection-level, seven line display after a first directional stroke upward at the first selection level in FIG. 8A.

Another example of stroke guidance display where seven display lines are available is depicted in FIGS. 8A and 8B. In this display configuration, all of the information elements selectable in four directions by a sequence of two strokes is depicted just as they are positioned in FIG. 6 except the nodes are not shown. Now, when the input key in a first stroke is moved upward to select the numeric set, zero, one, two, or three, a display is generated as shown in FIG. 8B. In FIG. 8B, the display is the same as FIG. 8A except the numeric character set, zero, one, two, and three, is indicated in bold. Thus, the user is guided so that after the first upward directional stroke the second directional stroke may be used to select the numerals zero, one, two, or three.

Figures 9, 10:
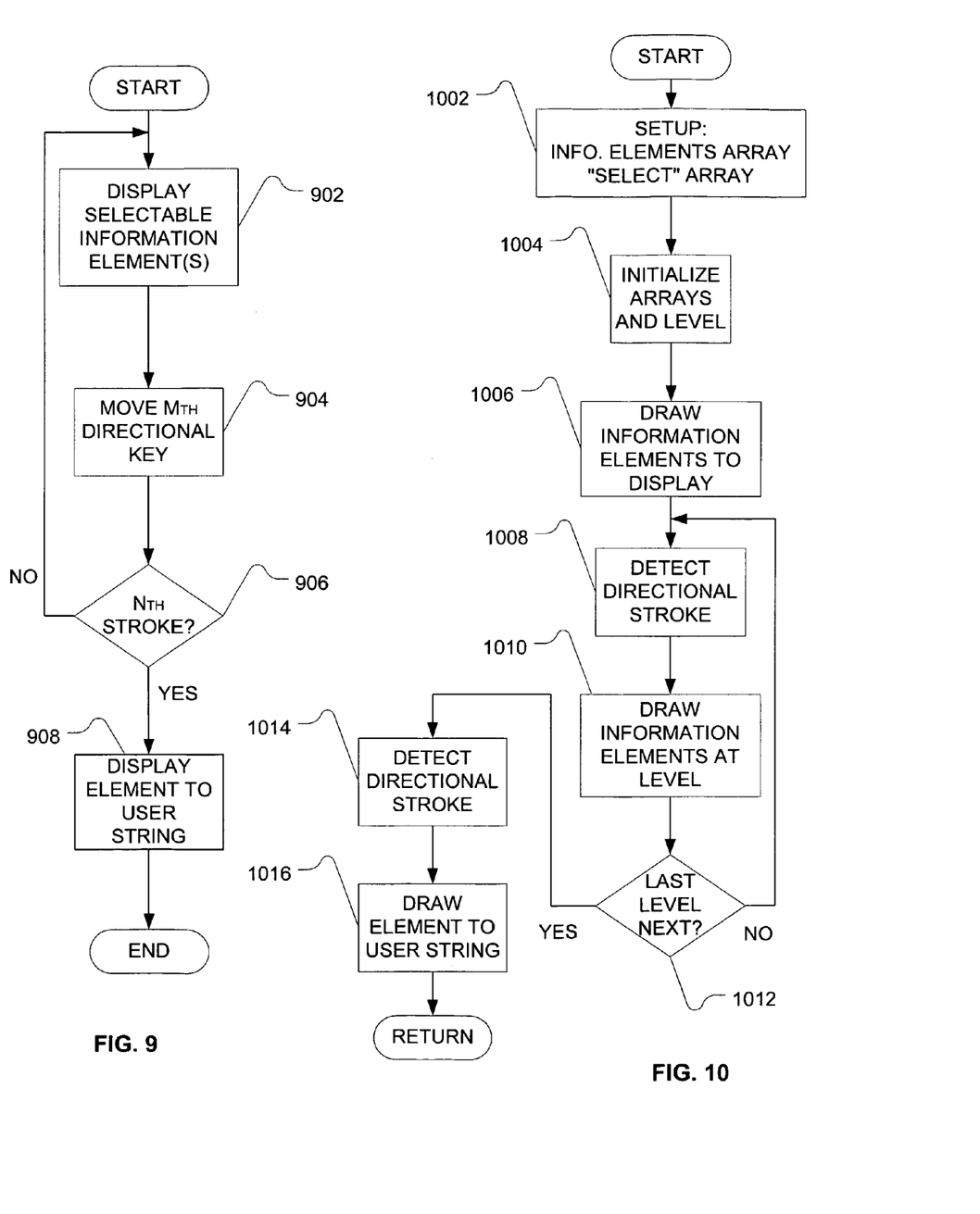
FIG. 9 shows another embodiment of an operational flow diagram for user interface operations performed in inputting information into a computing system in accordance with multiple, multi-directional key strokes where the display of input choices is updated after each stroke.
FIG. 10 shows an operational flow diagram for computing system operations interpreting multiple, multi-directional strokes to update the user choices after each stroke and load the selected information element in the system after the last stroke.

FIG. 9 illustrates the user interface operations in embodiments of the invention updating displays of stroke guidance patterns as key strokes are performed. In FIG. 9 the operations to enter selectable information elements begins at display operation 902. Display operation 902 displays the full set of selectable information elements when the information entry process begins. These selectable information elements are arranged on the display in a manner to indicate the necessary directional stroke to select information element subsets.

Move operation 904 moves the directional key in one of M possible directions. Decision operation 906 tests whether the move made during operation 904 is the Nth stroke (last stroke) to select an information element. If not, the operational flow returns to display operation 902 to display the selectable information subset selected by the move in operation 904. If the move operation in act 904 is the Nth stroke, then the operational flow branches YES from decision operation 906 to operation 908 to display the selected information element in the user string. At this point the entry of an information element into the computing system at the user interface is complete.

FIG. 10 illustrates the operational flow in response to the user interface flow in FIG. 9. When the application is ready to receive information entry, the operation flow in FIG. 10 begins at setup operation 1002. The setup operation 1002 sets an information elements array and a "select" array. The information elements array stores a hierarchical tree of information elements that may be selected by the user. The select array stores the stroke directional information at each level of the tree as the user makes choices in moving through the tree.

The initialize operation 1004 initializes the information elements array and the select array. The information elements array is initialized to contain the information elements from which the selections are to be made. The select array is set to a first level and if the button is four directional, that level will have one of four values after the user makes the first directional move of the input key. The initialize operation 1004 also sets the initial level to 0 indicating no strokes have been made with the input key.

Operation 1006 draws the information elements on a display screen page in the computer memory for display by the display screen. Operation 1006 draws this screen based on the information in the information elements array and the select array. After the arrays are initialized, draw operation 1006 will combine their information. Since the level information at level 0 has no directional information, then the full informational element array will be displayed.

Detect operation 1008 will detect the directional stroke made by the user in moving the Mth directional key (operation 904) in FIG. 9. This directional information is stored at level 1 of the select array. If an upward stroke was made with the directional key, then level 1 would store a value indicating an upward stroke. Operation 1010 combines the information from the information elements array and the select array and then redraws the selected information elements for level 1 selection. If the display was that as depicted in FIGS. 7A and 7B, then operation 1010 for an upstroke would depict the numeric information in 7B. If the display is a numeric or arithmetic operation display as depicted in FIG. 8A and level 1 is an upstroke, then operation 1010 will depict all the arithmetic keys as in FIG. 8B with the character set in the upper quadrant highlighted in bold. In either case, operation 1010 combines information from the information elements array and from the select array. The information elements array gives all of the information elements that can be displayed and the select array identifies character subset from the information elements that is to be highlighted or displayed as a result of detecting the directional stroke in operation 1008.

Query operation 1012 tests whether the level reached, or number of strokes completed, represents the next to last level, or N−1 stroke, in selecting an information element. If the level reached does not represent the N−1 stroke, then the operation flow returns to operation 1008 to await detection of the next directional stroke. Operations 1008 and 1010 repeat for each level as the user makes strokes with the directional key to move through the hierarchy of information elements. When query operation 1012 detects the next to last level reached, or N−1 stroke detected, the operation flow branches YES to detect operation 1014.

Detect operation 1014 detects the last directional stroke. This information will specify the direction information at the last level in the select array. The information in the select array reflecting the user's choices, as the user moved through the hierarchical tree, is now combined with the information in the information elements array to identify a information element selected by the user. Operation 1016 identifies and draws this selected element as a part of the user input string. The operational flow for entry of this selected information element is now complete and flow returns to the main application program to await entry of the new information.

Figure 11:
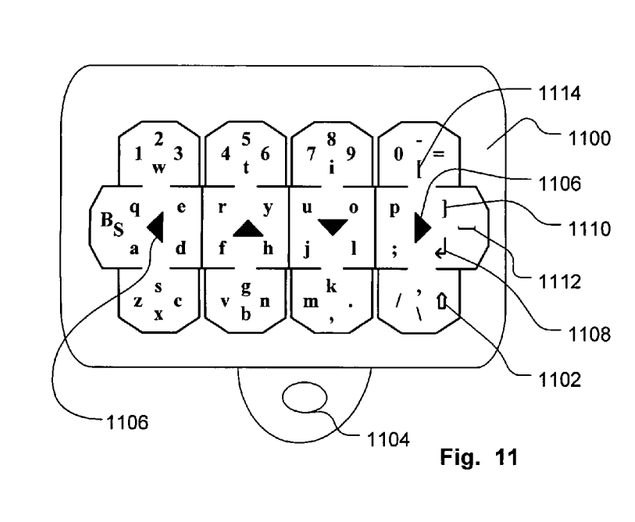
FIG. 11 shows a keystroke pattern guide for a QWERTY key display is a very small computing device such as a digital watch.

FIG. 11 illustrates another embodiment of the invention where the user interface displays a QWERTY keyboard and display area 1100, and a user input quad-directional button 1104 is available to operate with the display. This display might simply be a digital display on a watch or possibly on a cellular phone. The embodiment in FIG. 11 is again based on a two axis key having four possible directional movements and three strokes with the key to select a given soft key displayed in the screen area 1102.

Figure 12:
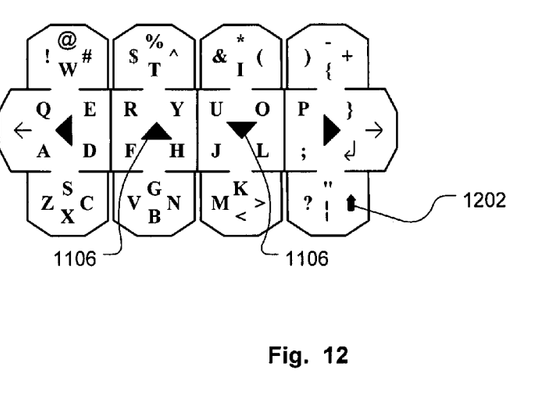
FIG. 12 shows the QWERTY key display of FIG. 11 with the uppercase key display selected.

The QWERTY key display in FIG. 12 is a companion display to that of FIG. 11 and represents upper case keys available by shifting the selectable information elements to another set. The shift indication in FIG. 12 is arrow 1202 which is filled in FIG. 12 indicating the upper case character set is selected. The same arrow 1102 in FIG. 11 is not filled indicating a lower case character set is selected.

Figure 13:
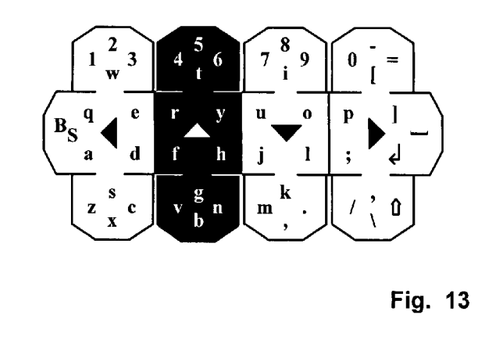
FIG. 13 shows the lower case QWERTY key display from FIG. 11 after a first upward directional stroke has selected a character subset shown highlighted.
Figure 14:
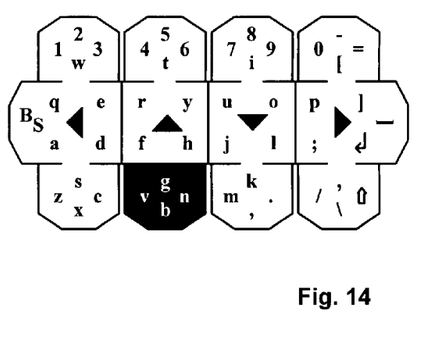
FIG. 14 shows the lower case QWERTY key display from FIG. 11 after a first upward directional stroke followed by a second, downward stroke has selected a character subset, v g n b, shown highlighted.

The bold arrowheads 1106 in the displays in FIGS. 11 and 12 indicate the possible first directional movement of the input key 1104 and the resulting character subset that would be selected. For example, if the character set is initialized to a lower case set and the first stroke of the quad-directional input button is upward, then the character subset highlighted in FIG. 13 is selected. The highlighting of this set indicates to the user that an upward stroke would select character subset, 4 5 6 t. A left stroke would select character subset, r f, and a right stroke would select character subset, y h. If the user moves the quad-directional button 1104 downward, the character subset selected is v g n b as depicted by highlighting in FIG. 14. The highlighting provides guidance to the user so that in the last stroke, i.e., the third stroke, the user may select one of the characters v g n b.

In another embodiment of the invention, special characters might be accessed with fewer strokes. For example, in FIG. 11, the enter key 1108 could be the only information element selected by two left strokes. Of course, if this is done then two elements, right bracket 1110 and underscore 1112, are displaced or lost. The underscore can be recovered by putting it in place of left bracket 1114. Then only the brackets are lost when assigning two strokes to select carriage return, or enter function 1108, in this case.

Accordingly, embodiments of the invention do not have to use the same number of strokes for each information element. However, each time few strokes are used for a given information element, fewer information elements can be selected, and the information element capacity of the J-key is reduced.

Thus, the present invention is presently embodied as a user interface and a computer method or apparatus, and computer readable medium for inputting information into a computing system with a multi-directional input button or key. Further, in addition to alphanumeric information elements being input by the multi-directional input button or key, the information elements may be graphical information elements such as icons, images, internet links, program links, file links, etc.

While the invention has been particularly shown and described with reference to preferred embodiments thereof, it will be understood by those skilled in the art that various other changes in the form and details may be made therein without departing form the spirit and scope of the invention.

What is claimed is:

1. Method for inputting an information element from an information element set in an information processing device having a multiple axes input key movable in M multi-axial directions, said method comprising the acts of:
   moving the key in one of the M multi-axial directions to generate a selection stroke;
   repeating said act of moving the key N number of times to generate N selection strokes, a pattern of N selection strokes with each stroke being in one of M multiple-axial directions defining the information to be input to the information processing device; and
   wherein the number of selection strokes N is given by a logarithmic value of a number of information elements in the information element set to a base M where M is the number of possible directions available from the multiple axes input key for each selection stroke.

2. The method of claim 1 wherein each act of moving comprises:
   providing a selected subset of information elements from the information element set choices existing prior to the act of moving.

3. The method of claim 2 wherein the $N^{th}$ stroke of the input key provides a final selected subset of information to be input to the information processing device.

4. The method of claim 3 wherein the information element set is a set of characters.

5. The method of claim 4 wherein the information processing device has a display screen to display the final selected subset of information as a character.

6. The method of claim 4 wherein the set of characters are alphabetic characters.

7. The method of claim 4 wherein the set of characters are numeric characters.

8. The method of claim 2 wherein the information processing device has a display screen to display each subset of information elements after each stroke of the input key.

9. A method for interpreting a sequence of input strokes by a multiple axes input key to input an information element into a computing system, said method comprising:
   drawing a display of the selectable information element set in a pattern illustrating input key stroke directions for selecting subsets of the selectable information element set with the input key;
   detecting a multi-axial key stroke direction from movement of the input key;
   identifying from the key stroke direction a selected subset of the selectable information element set;
   repeating the detecting action and identifying action for a predetermined number of strokes N by the input key so that the identifying step after the last stroke of the input key identifies a selected information element to be loaded into the computing system; and
   wherein the predetermined number of strokes N is given by a logarithmic value of a number of the selectable information elements in the selectable information element set to a base M where M is a number of possible direction available from the input key for each selection stroke.

10. The method of claim 9 further comprises:
    loading the selected information element into a user input string for the computing system.

11. The method of claim 9 wherein M equals the number of axes of the input key multiplied by the number of detectable stroke directions in each axis to define the number of directional movements available with the input key.

12. The method of claim 11 wherein said detecting action comprises:
   detecting a stroke direction by detecting actuation of a switch along an axis of the input key.

13. The method of claim 9 further comprises:
   updating the display, after the identifying action, to display the selected subset of the information element set identified by the identifying action whereby a user is guided to the next choices available through the input key.

14. A user interface method in a computing system for inputting a plurality of information elements through a single input device capable of multiple axes strokes, said interface method comprising:
   entering a multi-axial directional stroke with the input device to select a subset of information elements to be selected;
   repeating said entering step for a predetermined number of strokes N until a desired information element is selected and where the predetermined number of strokes N is identical for each input of a selected information element; and
   wherein the predetermined number of strokes N is given by a logarithmic value of the number of the information elements in an information element set to a base M where M is a number of possible directions available from the input device for each selections stroke.

15. The method of claim 14 further comprises:
   displaying an information element set of selectable elements for input into the computing system to illustrate subsets of information elements selectable with each directional stroke.

16. The interface method of claim 14 further comprises:
   updating the subset of information elements displayed by said displaying action based on the directional stroke entered by the entering action.

17. The interface method of claim 15 wherein the displaying action displays the information elements arranged in a pattern to provide guidance as to what subsets of informational elements will be selected by the next directional stroke.

18. The interface method of claim 14 wherein the displaying action displays the information elements arranged in a pattern to provide guidance as to what subsets of informational elements will be selected by the each directional stroke.

19. A computing system for interpreting directional strokes from a multiple axis input button to enter information into the computing system, said computing system comprising:
   a display processor drawing a display page for a display screen, the display page containing information elements arranged in a pattern to guide selection of information elements by directional strokes of the input button;
   an input adapter detecting multi-axial directional strokes by the input button;
   a stroke processor identifying an information element for entry in the computing system, the information element identified based on a sequence of multi-axial directional strokes N detected by the adapter, the number of strokes in a sequence being the same for all information elements; and
   wherein the number of strokes in a sequence to select an information element is given by the expression $N = \log_{(M)} E$ where N is the number of strokes, M is the number of possible directions for each stroke of the input button, and E is the number of information elements in an information element set from which a desired information element is selected.

20. The computing system of claim 19 wherein the stroke processor comprises:
   information elements array storing the information elements as a hierarchy with a level of the hierarchy associated with each stroke;
   a select array storing the direction of each stroke at a select level associated with each stroke; and
   the stroke processor combining information from the information elements array and the select array to identify a selected information element.

21. The computing system of claim 20 wherein:
   the stroke processor combines information from the information elements array and the select array after each detected stroke to identify a subset of selected information elements; and
   the display processor displays the subset of selected information elements after each detected stroke to provide a guide in the selection of information elements or element by the next stroke.

22. The computing system of claim 19 where the number of information elements E is sixty four graphical or character keys, the number of possible directions for each stroke is four and the number of strokes N in a sequence is 3.

23. The computing system of claim 19 where the number of information elements E is sixteen graphical or character keys, the number of possible directions for each stroke is four and the number of strokes N in a sequence is 2.

24. A computer readable medium readable by a computer and encoding instructions for executing a computer process for interpreting a sequence of input strokes by a multi-directional input key to input an information element into a computing system, said method comprising:
   drawing a display of the selectable information element set in a pattern illustrating input key stroke directions for selecting subsets of the selectable information element set with the input key;
   detecting a key stroke direction from movement of the input key;
   identifying from the key stroke direction a selected subset of the selectable information element set;
   repeating the detecting action and identifying action for a predetermined number of strokes N by the input key so that the identifying step after the last stroke of the input key identifies a selected information element to be loaded into the computing system; and
   wherein the predetermined number of strokes N is given by a logarithmic value of a number of the selectable information elements in the selectable information element set to a base M where M is a number of possible directions available from the input key for each selection stroke.

25. The computer process in the computer readable medium of claim 24 further comprises:
   loading the selected information element into a user input string for the computing system.

26. The computer process in the computer readable medium of claim 24 wherein the predetermined number of strokes N is given by the logarithmic value of the number of the information elements in the information element set to a base M where M is the number of directional strokes available from the input key.

27. The computer process in the computer readable medium of claim 26 wherein M equals the number of axes of the input key multiplied by the number of detectable stroke directions in each axis to define the number of directional movements available with the input key.

28. The computer process in the computer readable medium of claim 27 wherein said detecting action comprises:
  detecting a stroke direction by detecting actuation of a switch along an axis of the input key.

29. The computer process in the computer readable medium of claim 24 further comprises:
  updating the display, after the identifying action, to display the selected subset of the information element set identified by the identifying action whereby the a user is guided to the next choices available through the input key.

30. A computer readable medium readable by a computer and encoding instructions for executing a computer process for interpreting directional strokes from a multiple axes input button to enter information into a computing system, said computer process comprising:
  drawing a display page for a display screen, the display page containing information elements arranged in a pattern to guide selection of information elements by directional strokes of the input button;
  detecting multi-axial directional strokes by the input button; and
  identifying an information element for entry in the computing system, the information element identified based on a sequence of directional strokes detected by the adapter; and
  wherein the number of strokes in a sequence to select an information element is given by the expression $N=\log_{(M)} E$ where N is the number of strokes, M is the number of possible directions for each stroke of the input button, and E is the number of information elements in an information element set from which a desired information element is selected.

31. The computer process in the computer readable medium of claim 30 wherein the identifying action comprises:
  storing the information elements in an information elements array as a hierarchy with a level of the hierarchy associated with each stroke;
  storing the direction of each stroke in a select array at a select level associated with each stroke; and
  combining information from the information elements array and the select array to identify a selected information element.

32. The computer process in the computer readable medium of claim 31 wherein:
  the combining action combines information from the information elements array and the select array after each detected stroke to identify a subset of selected information elements; and
  the displaying action displays the subset of selected information after each detected stroke to provide a guide in the selection of information elements or element by the next stroke.

33. The computer process in the computer readable medium of claim 30 wherein the number of strokes in a sequence is the same for all information elements.

34. The computer process in the computer readable medium of claim 30 where the number of information elements E is sixty four graphical or character keys, the number of possible directions for each stroke is four and the number of strokes N in a sequence is 3.

35. The computer process in the computer readable medium of claim 30 where the number of information elements E is sixteen graphical or character keys, the number of possible directions for each stroke is four and the number of strokes N in a sequence is 2.

* * * * *

UNITED STATES PATENT AND TRADEMARK OFFICE
CERTIFICATE OF CORRECTION

PATENT NO. : 6,972,748 B1 Page 1 of 1
APPLICATION NO. : 09/652330
DATED : December 6, 2005
INVENTOR(S) : Lang It is certified that error appears in the above-identified patent and that said Letters Patent is hereby corrected as shown below:

In column 2, line 51, delete "selection level" and insert -- selection-level --, therefor.

In column 2, line 57, delete "selection level" and insert -- selection-level --, therefor.

In column 13, line 15, in Claim 29, after "whereby" delete "the".

Signed and Sealed this

Eighth Day of September, 2009

David J. Kappos
*Director of the United States Patent and Trademark Office*